June 26, 1962 G. PAPP 3,041,543
WAVE DETECTOR
Filed Jan. 6, 1955 4 Sheets-Sheet 1

INVENTOR.
GEORGE PAPP
BY
George A. Gust
ATTORNEY

June 26, 1962 G. PAPP 3,041,543
WAVE DETECTOR
Filed Jan. 6, 1955 4 Sheets-Sheet 2

INVENTOR.
GEORGE PAPP
BY
George R. Just
ATTORNEY

June 26, 1962 G. PAPP 3,041,543
WAVE DETECTOR
Filed Jan. 6, 1955 4 Sheets-Sheet 3 a    b

INVENTOR.
GEORGE PAPP
BY
George R. Gust
ATTORNEY

June 26, 1962     G. PAPP     3,041,543
WAVE DETECTOR

Filed Jan. 6, 1955     4 Sheets-Sheet 4

INVENTOR.
GEORGE PAPP
BY
*George R. Gust*
ATTORNEY

United States Patent Office 3,041,543
Patented June 26, 1962

3,041,543
WAVE DETECTOR
George Papp, Fort Wayne, Ind., assignor to International Telephone and Telegraph Corporation
Filed Jan. 6, 1955, Ser. No. 480,177
12 Claims. (Cl. 329—162)

The present invention relates to a wave detector and more particularly to an electron discharge device capable of detecting signals of microwave frequencies.

At the present stage of development of the art, crystals are popularly and conventionally employed to detect microwave signals. The deficiencies of crystal detectors are well known and include such operating limitations as low signal to noise ratio, inability to withstand relatively high variations in ambient temperature, and signal overloads. Under signal overloads, the crystals either saturate or burn out, whereupon reliable operation of the crystal under widely varying conditions can never be achieved.

In sharp contrast to the crystal detector, is the vacuum tube which can be operated over more widely varying conditions. Therefore, it is desirable to have a vacuum tube of the detector type which can be operated at microwave frequencies in the order of 10,000 megacycles. In achieving such a tube, the transit time of the electrons limits the upper frequency at which the tube may operate, such that where the transit time of electron flow is greater than the period of the signal wave, rectification or detection is impossible by the usual methods. Several devices have been proposed and actually used wherein the transit time is reduced to a minimum by spacing the anode contiguous with the cathode; however, these particular tubes can handle only very meager amounts of power.

In view of the foregoing, it is therefore an object of this invention to provide an evacuated tube type detector which will operate at microwave frequencies independently of electron transit time.

It is another object of this invention to provide an apparatus for detecting relatively powerful signals at microwave frequencies without suffering the usual damaging results encountered in use of crystals.

It is still another object of this invention to provide a microwave detector which may be coupled to either a coaxial transmission line or to a wave guide for detecting relatively powerful signals.

It is still another object of this invention to provide a unique method for coupling external circuitry between the anode and cathode electrodes of a coaxial microwave diode made according to this invention.

It is yet another object of this invention to provide a microwave detecting apparatus having relatively high operating impedances at operating frequencies, but which may be coupled to a low impedance signal input transmission line in an efficient and reliable manner.

In accordance with the present invention there is provided an apparatus for rectifying a high frequency wave train comprising a vacuum tube having cathode and anode electrodes which extend in the direction of wave propagation and which have a length several times the length of a wave at said frequency, an input connection to apply said wave train between said electrodes, and a signal output circuit coupled between the two electrodes and comprising a load impedance which provides a rectified voltage corresponding to the high frequency wave train. A unique feature of this arrangement is that the output circuit may be connected between the two electrodes without disturbing the wave-propagating characteristics between the two electrodes. This is accomplished primarily by means of a terminating circuit which conductively interconnects the cathode and anode electrodes of the tube through a path which circumvents the space between the cathode and the anode.

For a better understanding of the invention, together with other and further objects thereof, reference is made to the following description, taken in connection with the accompanying drawings, the scope of the invention being defined by the appended claims.

Figure 1:
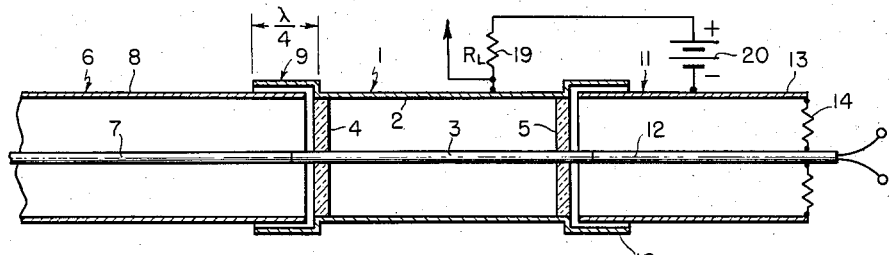
FIG. 1 is a longitudinal section of one embodiment of this invention.
Figure 2:
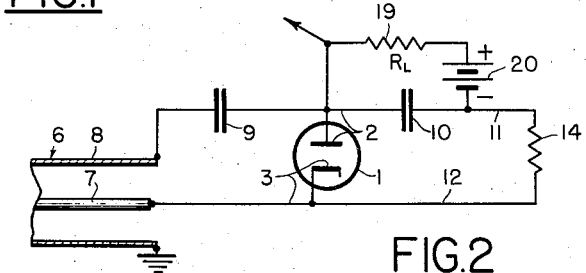
FIG. 2 is an equivalent circuit diagram used in explaining the operation of the invention.
Figure 3:
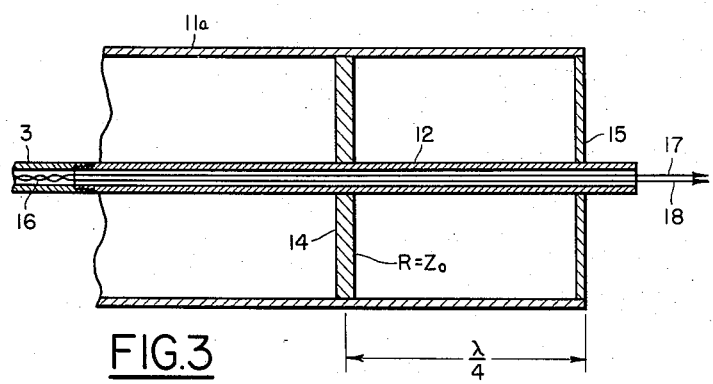
FIG. 3 is an enlarged fragmental section showing means for heating the cathode.

Referring now to the drawings, and more particularly to FIGS. 1, 2 and 3 thereof, the diode is indicated generally by the reference numeral 1 and comprises essentially coaxially arranged anode and cathode electrodes 2 and 3, respectively. The spacing between the electrodes 2 and 3 is fixed by the glass or the like insulating spacers 4 and 5 which serve to seal hermetically the tube for evacuating the latter. This spacing between the anode and cathode may correspond to electron transit time which is many times greater than the period of the wave at which the tube is operated, but usually it is determined by the characteristic impedance and the size of the signal lines which are to be connected thereto. If the tube 1 is to be excited by a coaxial transmission line, such as the line 6 having inner and outer conductors 7 and 8 respectively, the anode 2 and cathode 3 are spaced apart and made to such size as to present a characteristic impedance equal to that of the line 6.

A quarter wavelength coupling choke 9 provides the operating coupling between the outer conductor 8 of the input line 6 and the anode 2 of the tube. The inner conductor 7, however, is directly connected to the left end of the cathode 3 which projects through the glass spacer 4. The choke 9 is of conventional construction and provides a low impedance path for the microwave signals, but presents an open circuit to the flow of direct current between the two conductors 8 and 2. A similar choke 10 is provided on the right-hand end of the tube 1 and provides a coupling between the tube and the terminating section of coaxial line 11 which is provided with inner and outer conductors 12 and 13, respectively. A terminating resistor 14 is connected between the conductors 12 and 13, and is of a value equal to the characteristic impedance of the line. Considering the coaxial line 6, the tube 1, and the terminating line 11 in complete assembly, it will be noted that the three elements together constitute a single coaxial transmission line of constant characteristic impedance between its ends, the terminating resistor 14 providing a proper termination for the line. The choke coupling 10 conducts the high frequency waves, but serves as an open circuit to the flow of direct current. The inner conductor 12 of the terminating line 11 is connected directly to the right hand end of the cathode.

Reference to FIG. 3 reveals in more detail the construction and arrangement of the cathode 3 and the terminating line 11, and in addition shows a slightly different method of terminating the line. The line 11a is terminated at its right hand end by a shorting disc 15 which is a quarter wavelength of the operating frequency from the terminating resistor 14. The inner conductor 12 is tubular and is directly connected at its end to the cathode 3 which is also tubular. The outer peripheral surface of the cathode 3 is coated with any suitable thermally emissive material, which emits electrons upon being heated, such materials being conventionally used in vacuum tubes. The cathode is heated by means of a suitable filament 16 (FIG. 3) having leads 17 and 18 which emerge from the right hand end of the tubular conductor 12.

The detecting circuitry comprises a series-connected load resistor 19 and a direct current supply voltage 20 coupled between the anode 2 and the outer conductor 13 of the terminating line 11. The cathode 3 is thereby made negative with respect to the anode 2 through the conductive path which includes the outer conductor 13 of the terminating line, the terminating resistor 14, the inner conductor 12 and the cathode 3. Space current conducted between the cathode 3 and anode 2 will therefore flow through the resistor 19 from which a signal voltage may be taken.

In operation, a signal at a microwave frequency is conducted by the input line 6 into the left hand end of the tube 1 which extends in the direction of wave propagation. Electron emission from the cathode 3 is affected by the field of the microwave signal between the cathode and anode so as to produce a space current which is predominantly unidirectional. Since the tube 1 absorbs only negligible energy from this microwave signal, it follows that the terminating line 11 and the resistor 14 can suitably terminate the entire apparatus. This unidirectional current passing through the load resistor 19 produces a voltage of predominantly unidirectional character which may be utilized in any well known manner.

FIG. 2 is an illustration of an equivalent circuit diagram of the embodiment of FIG. 1 with like numerals being assigned to like parts. This circuit illustrates diagrammatically the feature of the chokes 9 and 10 constituting low capacity condensers at the microwave frequencies which present little or no impedance to the passage of the microwave signals, but which present an open circuit to the passage of direct current flow.

Figure 7:
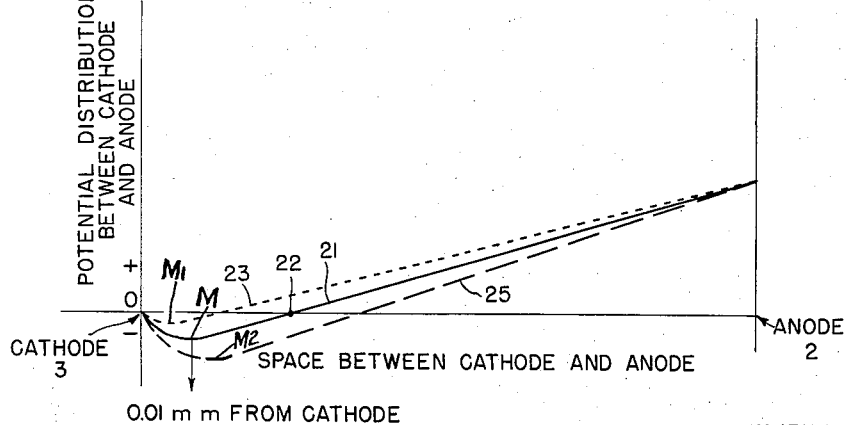
FIG. 7 is a graph used in explaining the operation of this invention.
Figure 8:
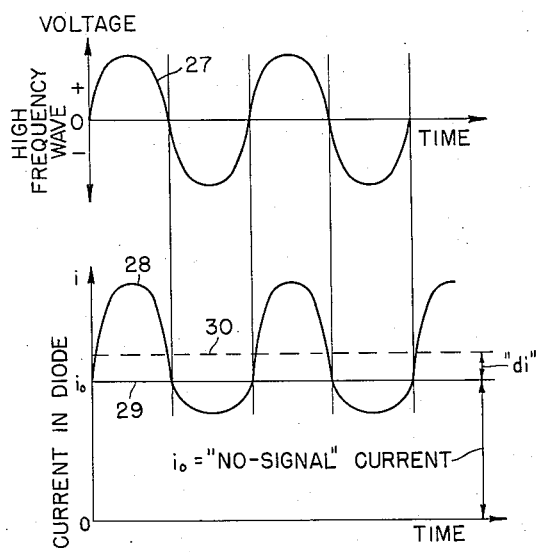
FIG. 8 is a wave diagram also used in explaining the operation of this invention.
Figure 12:
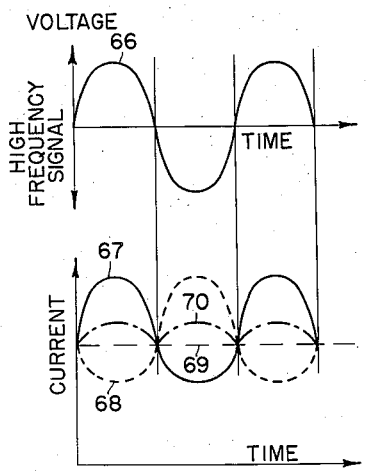
FIGS. 10, 11 and 12 are field and wave diagrams used in explaining the operation of the embodiment of FIG. 9.

In consideration of the operation of the invention, reference is made to FIGS. 7 and 8. The curves of FIG. 7 represent the instantaneous potential distribution between the cathode and anode electrodes of the diode. The curve indicated by the reference numeral 21 may be considered as the static curve under conditions of no microwave signal but with the battery supply 20 being connected between the anode and cathode as explained. During electron emission from the cathode 3 and flow of electrons through space over to the anode 2, the electrons encounter the potentials exemplified by the curve 21. For example, the space potential adjacent the cathode to the left-hand side of the cross-over point 22 on the curve is negative having a potential minimum at point M, whereupon the electrons left of point M have a repelling force exerted thereon which tends to return them to the cathode. Those electrons which successfully penetrate this negative potential space and enter the positive slope region on the right-hand side of the point M will all flow to the anode at a rate of acceleration determined by the increasing potential distribution. Thus, briefly restating the foregoing, those electrons which are not successful in reaching the point M on the curve and are returned to the cathode do not contribute to the space current reaching the anode, or in other words, contribute to the anode current. Those electrons which pass through the negative potential slope region and pass the point M will all reach the anode and contribute directly to the anode current.

This curve of FIG. 7 which represents the instantaneous potential distribution between the cathode and anode is well-known and accepted by the art. The accepted theory of why the potential adjacent the cathode is negative is that the heavy concentration of the negative charges of the emitted electrons produce a negative or repelling field. Some of the electrons leave the cathode at relatively low velocity such that when this negative field is encountered, they are returned immediately to the cathode. Those electrons which leave the cathode with relatively high velocities will pass through this negative barrier and into the accelerating positive field directed toward the anode.

It has been determined that the most negative space potential (the minimum point on the curve 21) lies in the neighborhood of 0.01 millimeter from the cathode.

Now assuming that the electron emission from the cathode is held constant, and the potential distribution between the cathode and anode is altered to follow the dashed line curve 23, it is immediately seen that more electrons will get through the negative potential barrier to contribute to the anode current. This is obvious from the drawing since the magnitude of the potential minimum $M_1$ is smaller than in the case of curve 21, and thereby exerts lesser repelling force on the electrons, whereupon a large number of electrons enter the positive potential region. Thus, since a larger number of electrons reach the anode in the case of the curve 23 than in the case of curve 21, the anode current will be higher.

Assuming the same electron emission from the cathode 3, but altering the distribution curve to that indicated by the reference numeral 25, it is seen that the amplitude of the negative potential adjacent the cathode is greater. It is obvious that fewer electrons will reach the positive region and contribute to the anode current whereupon the current will be materially less.

In further consideration of the theory of operation it should be understood that the potential minimum points on the curves 21, 23 and 25 are of primary concern. It has been found that by changing the potential minimum by equal amounts in the positive (curve 23) and in the negative (curve 25) directions, which directions correspond to the positive and negative excursions of a sinusoidal microwave signal introduced into the diode, the increase in space current for the positive change will be greater than the decrease of current for the negative change. By repeating this change periodically, which actually occurs for a sinusoidal microwave signal, the net result will be a space current having a mean value greater than the "no-signal" current of the diode in the absence of a microwave signal. This net increase is the rectified or detected current.

The relationships just described are illustrated in FIG. 8. Curve 27 represents the voltage of the microwave signal at one cross-sectional point of the diode as a function of time. The current in the diode is represented by curve 28. This curve 28 is a distorted sine wave in phase with the microwave curve 27, this phase relationship being determined from the fact that curve 28 intersects the static current line 29 ($i_0$) at the same instant that the curve 27 crosses the zero axis. Due to the fact that the upper excursion of the current 28 from line 29 is greater than the succeeding negative excursion, the mean value of the current indicated by the dashed line 30 is larger than the static or "no-signal" current 29. The difference of the two currents 29 and 30 indicated in the drawing as "$di$" is the rectified current.

While FIG. 8 is useful in explaining the process of rectification at a particular cross-sectional point of the diode, the same figure serves in illustrating the rectification of the microwave signal in a diode many wavelengths long at a particular instant of time. To understand this, the horizontal axis corresponds to the length of the tube instead of "time."

Briefly summarizing, the mean value of the current in a diode of many wavelengths long is greater than the current of the same diode in the absence of a microwave signal. As the wave propagates forwardly in the direction of the tube axis, the rectification as explained hereinabove is fulfilled at every instant at every cross-sectional point of the diode.

It may be proven mathematically and also experimentally that the magnitude of the rectified current is proportional to the square of the microwave field strength, or in other words the power of the microwave signal.

This detecting or rectifying principle of operation as exemplified by FIGS. 7 and 8 is utilized in the remaining embodiments of this invention as will now be described in detail.

Figure 4:
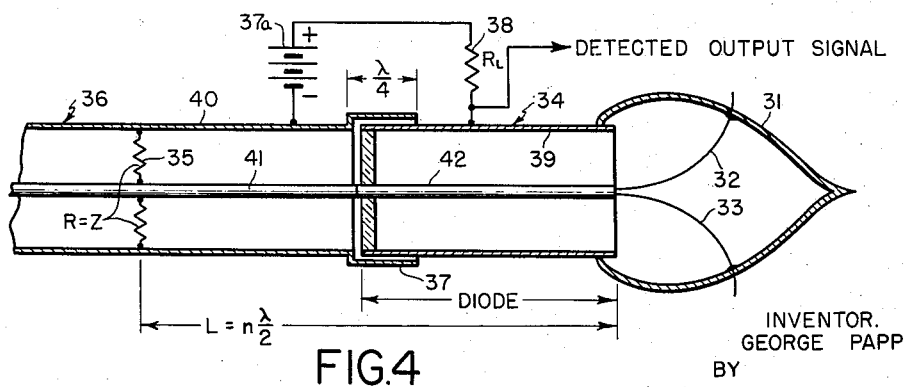
FIG. 4 is a longitudinal section of another embodiment of this invention.
Figure 5:
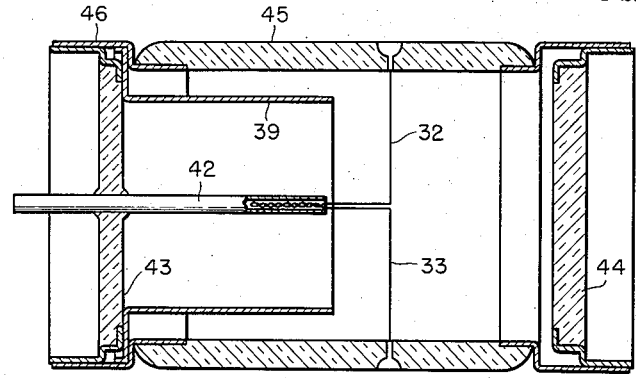
FIG. 5 is a longitudinal section of a specific tube design of the type of FIG. 4.

The tubes of FIGS. 4 and 5 are substantially identical in construction to that of FIG. 1 with the exception that no terminating line 11 is used. The end of the diode acts as an open end of a concentric line. Microwave signals will be reflected; however, the net effect is not harmful since at a distance of a half wavelength at the operating microwave frequency or any integral number of half wavelengths from the open end of the diode 34 are positioned suitable terminating resistors 35 having a value of resistance equal to the characteristic impedance of the input line 36. A choke connection 37, which may be the same as the choke connections 9 or 10 of FIG. 1, couples the line 36 to the tube 34. The detecting circuit comprises a series connected battery 37a and load resistor 38 connected directly between the anode 39 and the outer conductor 40. A biasing path is thereby provided which includes the conductor 40, the resistor 35, the inner line conductor 41 and the cathode 42. A microwave signal fed into the diode 34 is reflected from the open right-hand end to the left where it terminates in the resistor 35. Signal detection occurs the same as explained hereinbefore. The right-hand end of the diode is not terminated, but is enclosed by an evacuated glass bulb 31. Filament leads 32 and 33 project through the walls of the envelope 31 for attachment to an external filament supply voltage. By using filament connections of the proper length, microwave signal losses will be eliminated.

A working embodiment of the tube FIG. 4 is illustrated in FIG. 5 wherein the end plates 43 and 44 and the tubular envelope 45 all made of glass constitute the evacuated housing for the tube. The anode 39 is a metallic tubular member flanged on its left end to be clamped between the end plate assembly 43 and a suitable metallic ring 46 which projects from the glass cylinder 45, and serves as the choke connection of the outer conductor of the input concentric line.

Figure 6:
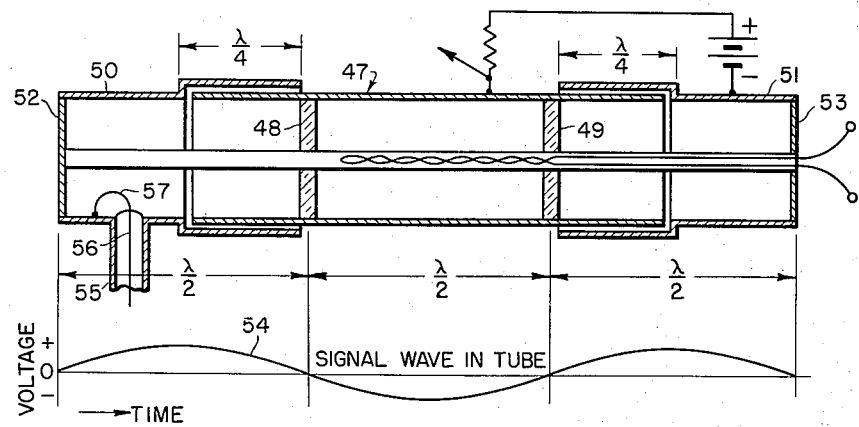
FIG. 6 is a longitudinal section of still another embodiment of this invention.
Figure 6A:
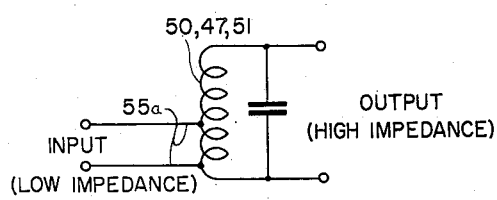
FIG. 6a is a circuit diagram used in explaining the operation of the device of FIG. 6.

A decided improvement in the signal-to-noise ratio in the detected signal is attained by the embodiment of this invention illustrated in FIGS. 6 and 6a. The tube of FIG. 6 is of resonant length at the microwave frequency and is composed of a diode portion 47, in the spacers 48 and 49, and halfwave extensions 50 and 51. The space between the spacers 48 and 49 is evacuated. These spacers are disposed a halfwave length apart from the ends to maintain losses to a negligible value. The extensions 50 and 51 are composed of coaxial lines, each comprising a quarter wavelength choke for coupling to diode 47. The opposite ends of the extensions 50 and 51 are short circuited by discs 52 and 53, respectively, to thereby provide a resonant cavity or line between the two ends 52 and 53, which include the diode. In order for the arrangement to be resonant, it is of course necessary that the length of the assembly be three half-wavelengths long at the operating frequency, or any other larger integral number of half-wavelengths, as illustrated by the sinusoidal wave 54 of FIG. 6. The signal input coaxial line 55 is connected into the extension 50 for exciting the resonant system 50, 47, 51, and is so positioned as to match the impedance of the line 55 to the impedance of the system. This is accomplished by positioning the connection of the center conductor 56 of the input line on the outer conductor of the coaxial extension 50 at a point where the impedance of the extension 50 equals that of the input line 55. The small exciting loop 57 couples the center input conductor 56 to the outer conductor of the coaxial extension 50 as shown.

An exemplification of this matching of impedances is illustrated by the circuit diagram of FIG. 6a in which the coil and the capacitance represent the resonant system 50, 47, 51 and the input line 55a is the same as the coaxial line 55. Considering that the coil and condenser of FIG. 6a are resonant at a predetermined frequency, a match of impedances between the system and the input line 55a is attained by tapping the latter onto the coil at the proper points as illustrated. A transformation from the low impedance to high impedance conditions is thereby achieved, and this transformation finds an exact equivalent in the construction of FIG. 6. It will of course be understood that this matching of impedances occurs only at a single frequency at which the tube is resonant, and cannot occur at any other frequency.

The importance to be attributed to this resonant condition is that by making the tube have as high an impedance as possible, the loss of signal energy will be kept to a minimum while the signal-to-noise ratio will measurably and appreciably increase.

Figure 9:
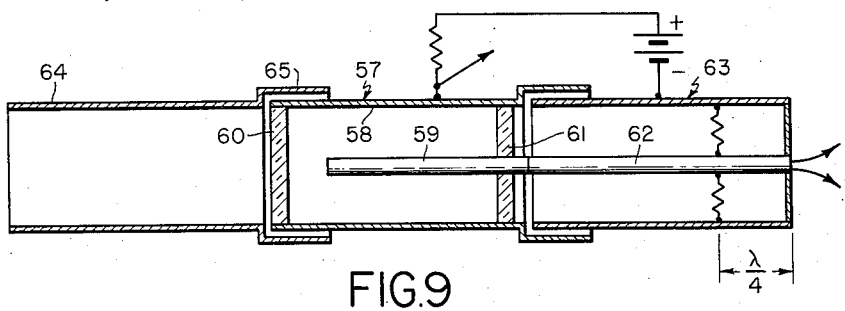
FIG. 9 is a longitudinal section of still a further embodiment of this invention.

The coaxial diode of the preceding embodiments may also be used in conjunction with wave guides as illustrated by FIGS. 9 through 12. With reference to FIG. 9, the diode 57 comprises anode 58 and a cathode 59. The glass or the like disc 60 closes the left hand end of the anode 58 and a single annular spacer 61 closes the right hand end of the anode. The cathode 59 projects through the spacer 61 to be connected to the central conductor 62 of a terminating line 63 which may be identical to the terminating lines 11 (FIG. 1) or 11a (FIG. 3). The circular wave guide 64 is coupled to the tube 57 by means of the usual coupling choke 65.

Figure 10:
Figure 11:
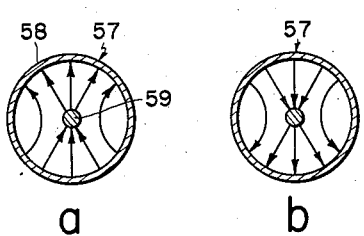

Considering the theory of operation, FIG. 10 illustrates the instantaneous position of the electric lines of force inside the wave guide which is commonly characterized as the $TE_{1,1}$ mode of transmission which applies primarily to circular wave guides. This mode of transmission excites the coaxial diode 57 as illustrated by FIG. 11, the lines of force in FIG. 11a representing the positive excursion of the signal wave while the lines of FIG. 11b represent conditions during the opposite excursion. During the period of excitation of the diode 57 illustrated by the force line diagram of FIG. 11a, the electrons which tend to leave the cathode 59 in upward direction will be urged onwardly to the anode 58 whereby those electrons issuing from the lower half of the cathode 59 will be partially repelled thereto as shown by the direction of the arrows. The upper half of the diode provides a greater increase, however, in the current, than the decrease in the lower half of the diode, and the result is an increase in the net current. Similarly during the opposite excursion of the microwave signal, the bottom half of the tube is effective to produce the rectified current. The current contributions of the discrete halves of the tube are plotted in FIG. 12 in phase with the microwave sinusoidal signal indicated by the reference numeral 66. The solid curve 67 represents the contribution of the upper half of the tube at every instant "$t$," while the dashed line curve 68 represents the contribution of the lower half of the tube. The rectified signal is then the difference between the original current 69 in the diode and the mean value, or the geometrical sum 70 of the two curves 67 and 68. Thus, it is apparent that with wave guide excitation, the diode 57 compares in operation to a full wave rectifier.

From the foregoing it will now appear that rectification is possible even though the transit time of the electrons issuing from the cathode is many times greater than the period of the microwave signal. The diode may be constructed as a part of a coaxial line and have a length many times that of the wavelength of the microwave signal. The diode of this invention may have a length which is limited only to that which completely absorbs the microwave signal energy, or on the other hand by the period of a low frequency wave which may be used to modulate the microwave signal.

Since the diode attenuates the incoming signal in much the same manner as a corresponding coaxial line, the signal is detected all along the tube length, and the magnitude of the detected signal current is, therefore, a function of tube length. The diode can be terminated by the same methods as ordinary coaxial lines are terminated. The important fact is, as mentioned previously, the microwave attenuation in the diode due to the rectification can be made negligibly small, and so the diode can be made several wave lengths long at the operating frequency. Short sections of the long diode operate the same as described hereinbefore. The incremental current increase of each section of the long diode accumulates additively on the anode electrode, thus providing an increase in output signal and improving the signal-to-noise ratio of the detecting action.

Figure 13:
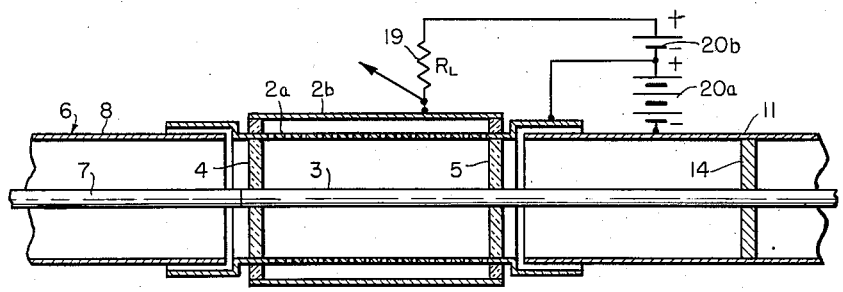
FIG. 13 is a sectional view of another embodiment.

Reference is now made to FIG. 13 which illustrates another embodiment of this invention preferred for some types of operation. Reconsidering the theory of detection as explained hereinbefore, it will be noted that the presence of the microwave signal in the diode increases the space current. This increase of current is detected by the drop of the anode voltage in the load resistor 19 which is caused by the voltage drop in the anode resistance. However, this voltage drop changes the direct current operating voltage of the diode, or, in other words, the potential difference between the cathode and anode. This change in potential distribution (see FIG. 7), as will now be apparent, will tend to assume the relative position of the curve 25 of FIG. 7 such as to decrease the value of the current 30 (FIG. 8). In the external circuitry, the observed degree or magnitude of rectification is by far less than would be expected, and in certain cases may be as low as five to ten percent (5 to 10%) of the current change produced by the microwave signal.

This drop of direct current voltage level on the anode is eliminated by the arrangement of FIG. 13. The external circuitry of this embodiment detects the current increase "$di$" (FIG. 8) without affecting the potential distribution in the diode such that full benefit of the microwave detection as described hereinabove is realized. In this figure, like numerals indicate like parts. The primary difference resides in the fact that the concentric-line diode is formed by the cathode 3 and a reticulate or screen type anode 2a, which is held at a constant potential by a battery 20a. The direct current potential distribution inside the diode is not influenced by the detecting action itself. A large portion of the electrons emanating from the cathode are not, however, collected by the anode 2a but pass through the openings to fall on the second anode 2b. This latter anode is connected to the load resistor 19 and to the positive pole of battery 20b which is connected in series with battery 20a. The current change "$di$" arriving at anode 2b produces a voltage change $$dV = di \cdot R_L$$

(where $R_L$ is the resistor 19) which can serve for the detection of the microwave signal.

Having disclosed one method for eliminating the effects of feedback encountered in the use of the embodiments of FIGS. 1 through 5, it will appear obvious to a person skilled in the art that other methods for doing the same thing are possible without departing from the scope of this invention.

Compared to a crystal diode, the invention provides the inherent advantages of better signal-to-noise ratio, greater reproducibility and production, safe operation in wide temperature limits, reduced danger of burn-out, and of steady operation at relatively high signal levels.

While I have described above the principles of my invention in connection with specific apparatus, it is to be clearly understood that this description is made only by way of example and not as a limitation to the scope of my invention.

Certain of the theoretical considerations of this invention have been published by the inventor in "Electrical Communications Magazine" of September 1954 on page 215.

What is claimed is:

1. Apparatus for rectifying a high frequency wave train comprising a vacuum tube having elongated cathode and anode electrodes lying in the direction of wave propagation and each having a length several times the length of a wave at said frequency, said electrodes being coaxially arranged with the inner electrode serving as the cathode, an input connection to apply said wave train to the entire space between said electrodes, and an output circuit coupled between said anode and cathode electrodes at a location outside of the radial space between said electrodes and comprising a load impedance which provides a rectified voltage corresponding to said high frequency wave train.

2. Apparatus for rectifying a high frequency wave train comprising a vacuum tube having only two electrodes coaxially arranged as cathode and anode electrodes which are longer than one length of a wave at said frequency, the inner electrode being the cathode, an input coupling on one end of said tube connected to said anode and cathode electrodes for coupling a coaxial transmission line thereto, said coupling conducting said wave train but serving as an open circuit to the passage of direct current, a terminating circuit operatively coupled to said tube between said cathode and anode at a location outside of the space between said anode and cathode and having a resistance substantially equal to the characteristic impedance of said tube as measured between said cathode and anode, said terminating circuit having a conductive connection to said cathode electrode, and an output circuit coupled between said terminating circuit and said anode electrode and including a conductive path between said anode and cathode electrodes which bridges said coupling, said output circuit including means for producing a rectified signal voltage which corresponds to said wave train.

3. Apparatus for rectifying a high frequency wave train comprising a vacuum tube having only two electrodes coaxially arranged as cathode and anode electrodes which are longer than one length of a wave at said frequency, the inner electrode being the cathode, an input coupling on one end of said tube connected to said anode and cathode electrodes for coupling a coaxial transmission line thereto, said coupling conducting said wave train but serving as an open circuit to the passage of direct current, a terminating circuit operatively coupled to said tube between said cathode and anode at a location outside of the space between said anode and cathode and having a resistance substantially equal to the characteristic impedance of said tube as measured between said cathode and anode, said terminating circuit having a conductive connection to said cathode electrode, and an output circuit coupled between said terminating circuit and said anode electrode and including a conductive path between said anode and cathode electrodes which bridges said coupling, said output circuit including a series-connected direct current voltage supply and a load resistance which in turn are connected in series between said anode electrode and said terminating circuit.

4. Apparatus for rectifying a high frequency wave train comprising a vacuum tube having coaxially arranged cathode and anode electrodes which are several times longer than one length of a wave at said frequency, an input coupling on one end of said tube connected to said anode and cathode electrodes for coupling a coaxial transmission line thereto, said coupling conducting said wave train but serving as an open circuit to the passage of direct current, a terminating circuit operatively coupled to the other end of said tube between said cathode and anode electrodes at a location outside of the space between said anode and cathode and having a resistance substantially equal to the characteristic impedance of said tube as measured between said cathode and anode, said terminating circuit including a length of coaxial line of the same characteristic impedance as said tube and having a center conductor conductively connected to said cathode electrode and an outer conductor coupled to said anode electrode through a choke coupling, said terminating coaxial line being terminated by a resistor which is equal to the characteristic impedance thereof, and an output circuit coupled between said terminating circuit and said anode electrode for providing a conductive path between said anode and cathode electrodes which bridges said choke coupling, said output circuit including means for producing a rectified signal voltage which corresponds to said wave train.

5. Apparatus for rectifying a high frequency wave train comprising a vacuum tube having coaxially arranged cathode and anode electrodes, insulating sealing members in the opposite ends of said tube, said cathode electrode extending through one member and terminating short of said other member inside said tube, an input coupling operatively coupled to said tube adjacent said other member for coupling a circular wave guide to said tube, a choke coupling for the other end of said tube, a terminating circuit for said other end and including a section of coaxial line of the same characteristic impedance as said tube and having a center conductor which is conductively connected to said cathode electrode and an outer conductor coupled to said anode electrode by means of said choke coupling, a resistor in said coaxial line which terminates the latter at its characteristic impedance, and an output circuit connected between said anode electrode and said outer conductor, said output circuit including a series-connected direct current voltage supply and a load resistor which produces a rectified voltage corresponding to said wave train.

6. A microwave detecting apparatus comprising a vacuum tube having coaxially arranged anode and cathode electrodes, the length of said electrodes being equal to an integral number of half wavelengths at the operating frequency, said tube thereby being resonant at said frequency, signal input coupling means operatively connected to said tube and having a predetermined characteristic impedance, said means being connected into said tube at a point having an impedance equal to said predetermined impedance thereby providing a transformation between said predetermined impedance and the tube resonant impedance, and an output circuit coupled between said electrodes in such a manner as not to disturb the tube wave-propagating characteristics, said output circuit providing a detected signal of said microwave.

7. The method of detecting a wave train comprising the steps of applying a microwave signal between coaxially extending cathode and anode electrodes which extend in an evacuated space over several wavelengths of said signal in the direction of signal propagation, said electrodes having a characteristic impedance and being terminated by a resistive connection externally of said evacuated space, emitting electrons along the extent of said cathode in said space, varying the discharge density of said electrons along the extent of said cathode within said space in accordance with said signal thereby producing a space current between said electrodes, and passing said space current through detecting circuitry disposed outside said space which is series-connected between said anode and said resistive connection.

8. Apparatus for rectifying a high frequency wave train comprising a vacuum tube having coaxially arranged cathode and anode electrodes which are longer than one length of a wave at said frequency, a tubular screen electrode coaxially interposed between said cathode and anode electrodes, an input coupling on one end of said tube for coupling a coaxial transmission line between said screen and cathode electrodes, said coupling conducting said wave train but serving as an open circuit to the passage of direct current, a terminating circuit operatively coupled to the other end of said tube which terminates said tube by a resistance substantially equal to the characteristic impedance thereof, said terminating circuit including a length of coaxial line having a center conductor conductively connected to said cathode electrode and an outer conductor coupled to said screen electrode through a choke coupling, said terminating coaxial line being terminated by a resistor which is equal to the characteristic impedance thereof, and an output circuit coupled between said terminating circuit and said anode electrode for providing a conductive path between said anode and cathode electrodes which bridges said choke coupling, said output circuit including means for producing a rectified signal voltage which corresponds to said wave train.

9. Apparatus for rectifying a high frequency wave train comprising a vacuum tube having coaxially arranged and elongated cathode and anode electrodes having a characteristic impedance, an input coupling on one end of said tube for coupling a high frequency wave train to the entire space between said cathode and anode electrodes, means outside of the space between said cathode and anode terminating the coaxial electrodes in the characteristic impedance thereof, a series conductive circuit connected between said cathode and anode electrodes, one end of said circuit conductively connected directly to said anode electrode, the other end of said circuit conductively connected to said cathode electrode through said terminating means, said circuit including a load impedance and a direct current voltage source connected in series whereby the space current conducted by said tube will flow through said series circuit for producing a signal across said load impedance.

10. Apparatus for rectifying a high frequency wave train comprising a vacuum tube having coaxially arranged cathode and anode electrodes having a characteristic impedance, an input coupling on one end of said tube for coupling a high frequency wave train to the entire space between said cathode and anode electrodes, means outside of the space between said cathode and anode terminating the coaxial electrodes in the characteristic impedance thereof, a series conductive circuit connected between said cathode and anode electrodes, one end of said circuit conductively connected directly to said anode electrode, the other end of said circuit conductively connected to said cathode electrode through said terminating means, said circuit including a load impedance and a direct current voltage source connected in series, said voltage source having negative and positive terminals, the negative terminal being adjacent said cathode electrode and the positive terminal being adjacent the anode electrode whereby space current will flow from anode to cathode and through said series circuit for producing a signal across said load impedance.

11. Apparatus for rectifying a high frequency wave train comprising a vacuum tube having only coaxially arranged cathode and anode electrodes longer than a wavelength at said frequency, the anode electrode being an elongated cylindrical sleeve of conductive material, the cathode electrode being a rod-like member of conductive material of substantially the same length as said anode electrode, electron-emissive material on said cathode electrode, the radial space between said cathode and anode electrodes being free of obstructions which would interfere with the flow of electrons therebetween, an input connection to apply said wave train to the entire radial space between said cathode and anode electrodes, and an output circuit conductively connected between said cathode and anode electrodes.

12. The apparatus of claim 11 wherein the cathode and anode electrodes are of length equal to an integral number of half wavelengths of the operating frequency of said tube.

References Cited in the file of this patent

UNITED STATES PATENTS

| | | |
|---|---|---|
| 2,106,770 | Southworth | Feb. 1, 1938 |
| 2,122,538 | Potter | July 5, 1938 |
| 2,241,976 | Blewett et al. | May 13, 1941 |
| 2,434,509 | Okress | Jan. 13, 1948 |
| 2,463,368 | Finke | Mar. 1, 1949 |